United States Patent [19]

Rinck et al.

[11] Patent Number: 4,563,935

[45] Date of Patent: Jan. 14, 1986

[54] MACHINE FOR THE DOUBLE TREATMENT OF WORKPIECES WHILE THEY ARE CONTINUALLY MOVING AND RECYCLED UPON A OPERATING DRUM, PARTICULARLY THE SUCCESSIVE VARNISHING OF BODIES OF REVOLUTION

[75] Inventors: Jean C. Rinck; Alain M. Lecomte, both of Mulhouse; Alain Scherrer, Pfastatt, all of France

[73] Assignee: Manufacture de Machines du Haut Rhin, "Manurhin", Mulhouse, France

[21] Appl. No.: 545,066

[22] Filed: Oct. 25, 1983

[30] Foreign Application Priority Data

Oct. 25, 1982 [FR] France .................................. 82 17794

[51] Int. Cl.⁴ .............................................. F42B 33/14
[52] U.S. Cl. ................................................ 86/17; 86/27; 198/608; 198/478.1
[58] Field of Search ............... 86/23, 24, 17, 27, 44, 86/45, 46; 118/423, 56; 198/342, 480, 482, 605, 608

[56] References Cited

U.S. PATENT DOCUMENTS

| | | |
|---|---|---|
| 189,057 | 4/1877 | Pratt et al. ................................. 86/17 |
| 1,770,620 | 7/1930 | Mann ........................................ 86/17 |

FOREIGN PATENT DOCUMENTS

| | | |
|---|---|---|
| 2330476 | 6/1977 | France . |
| 2333412 | 6/1977 | France . |
| 2346072 | 10/1977 | France . |
| 2356464 | 1/1978 | France . |
| 2376049 | 7/1978 | France . |
| 2379335 | 9/1978 | France . |
| 2463081 | 2/1981 | France . |
| 2475946 | 8/1981 | France . |

*Primary Examiner*—Stephen J. Lechert, Jr.
*Assistant Examiner*—Howard J. Locker

[57] ABSTRACT

An apparatus for the forming and/or treatment of cartridge cases while continuously travelling through a train of cartridge case treating instrumentalities, in particular a machine for varnishing or gumming the collar and the percussion cap thereof, said two operations being carried out, respectively, at a lower level and an upper level of an operating drum. An upstream transfer wheel leads untreated cartridge cases with a predetermined peripheral spacing to the lower level of the operating drum where varnishing of the collar or flange is carried out. The downstream transfer wheel returns the thus partially varnished cartridge cases and leads them to a recycling drum which at the same time turns the cartridge cases upside down, and introduces the thus turned cartridge cases to the upper level of the upstream transfer wheel. At the upper level of the operating drum there is then carried out the varnishing of the percussion cap, while the downstream transfer wheel returns the cartridge cases to lead them to a last wheel. The recycling effected between the upstream transfer wheel, the operating drum, and the downstream transfer wheel is effected with a distance between successive workpieces of one-half the normal spacing therebetween in the processing train of the apparatus, while the other wheels and the recycling drum operate with the normal distance between successive workpieces.

11 Claims, 14 Drawing Figures

FIG_4

FIG. 5

FIG_6

MACHINE FOR THE DOUBLE TREATMENT OF WORKPIECES WHILE THEY ARE CONTINUALLY MOVING AND RECYCLED UPON A OPERATING DRUM, PARTICULARLY THE SUCCESSIVE VARNISHING OF BODIES OF REVOLUTION

This invention relates to machines for the treatment of workpieces as they travel continuously through a succession of operating units.

Such machines are used in particular in the fabrication of a series of munitions. An installation for the fabrication of such workpieces comprises one or more chains of modules, each operating in continuous motion; in each chain, the workpieces (such as cartridge cases) follow a continuous trajectory or path, by the intermediary of transfer wheels, between different operating drums (that is to say being in charge of machining or shaping operations, of treatment or control, for example). Units of continuous operating installations have already been described in the following publications or patents: French No. 2,346,072, French No. 2,356,464, French No. 2,379,335, French No. 2,376,049, and French No. 2,459,196, in which a feeding module forms the point of departure of a continuously moving chain; French No. 2,333,412, French No. 2,330,476, French No. 2,475,946, and French No. 2,463,081, for modules which perform different machining or shaping operations upon ammunition cartridges.

Certain forming or shaping operations are particularly delicate to perform in continuous motion. Among these are the varnishing or gumming of cartridge case, which takes place on two different, opposite parts of the case: on one part at the level of the percussion cap, and at the other part at the level of the collet or flange of the cartridge case, essentially at the interior of the case. These varnishings must be carried out in a clean (or without dust particles) atmosphere. For the percussion cap, the varnishing must provide a secure sealing of the percussion cap in its seat. For the flange, the varnishing provides a supple or yieldable joint for receiving the projectile in the cartridge case. Further, both depositions of varnish must be carefully dried. All this renders it desirable that the two varnishing operations be located close to each other. But, although the multiple utilization of an operating drum has already been envisaged, no worthwhile and satisfactory solution has yet been arrived at for such problem: (1) to reduce to a minimum the risks incident upon the use of a continuous operating chain or train, all while making the units thereof mechanically simple; and (2) to dispose at the level of the operating drum in one place sufficient for the interposition of the shaping or forming or treatment units and their auxiliaries without excessively increasing the dimensions of the machine.

In certain cases, such as the varnishing of a cartridge case, the problem is further complicated, for it is necessary practically to invert the cartridge case between the two varnishing stages, all while providing a guiding means convenient for the continuously moving chain or train, and taking into consideration the external conicity of the cartridge case, as well as the different sizes of the cartridge cases to be manufactured.

The present invention provides a novel element of a continuously moving processing chain or train which solves the above-outlined problems.

To resolve the general problem expounded above, the invention provides a treating means for workpieces in a continuously moving train or chain of the type including an operating drum, adapted to carry out a treatment, having transfer elements upstream and downstream to carry the pieces to the operating drum, and to retake them, respectively, and a recycling drum for the pieces between the upstream and downstream transfer units, of such type that the pieces can pass a plurality of times in the same operating drum, as well as means for leading the pieces to the transfer element upstream of the operating drum and means for retaking the pieces after the downstream transfer element.

Such apparatus includes the following combination of elements:

the operating drum is provided with a first and a second level of circulation of pieces in which there are carried out at least two treating operations which are at least partially different, the working stations in such two superposed levels being offset a fraction of the normal spacing between successive workpieces, the upstream and downstream transfer units each comprising a first and a second wheel, also superposed, and spaced by the same fraction of the normal spacing between the successive workpieces, the first upstream and downstream transfer wheels each cooperating with the first level of the operating drum, while the second upstream and downstream transfer wheels cooperate with the second level of the operating drum, the means for initially feeding the pieces cooperating with the first upstream transfer wheel, while the means for returning the piece cooperates with the second downstream transfer wheel, such two operations proceeding at a normal rate, and the recycling drum is provided with a changing of level for causing the pieces to pass from the first downstream transfer wheel to the second upstream transfer wheel.

This permits at the same time to utilize simple elements at the levels of the transfer wheels, with guiding means without switching, all while improving the spacing between the two levels of the operating drum in order to permit the placing of treating or shaping units and their auxiliaries between them.

Very advantageously, the second level is above the first level. The operating drums often involve a descent of the level of the pieces; the invention to the contrary permits a recovering of height.

Very advantageously, the fraction of the spacing between successive workpieces is one-half the normal spacing therebetween.

In one particular manner of carrying out the invention, the recycling drum carries every workpiece by a retaining means adapted for vertical movement upon the rotor of the drum, by cooperating with a helicoidal cam on the stator of the drum.

According to another aspect of the invention, the retaining means for the workpieces is driven so as to pivot around a radial axis upon the drum, in such fashion as to invert the piece during the changing of the level thereof.

In a particular mode of carrying out the invention, the rotor of the drum carries a rail forming a vertical guide and having a traversing rack, the said workpiece retaining means being mounted upon a pivotal block affixed to a gear running upon said rack.

By preference, the radial axis of pivoting is near a median horizontal plane between the two levels of the operating drum, the inverting of the workpieces taking place around a fixed axis independent of their height.

The above-discussed aspects of the invention contribute to the solution of the specific problems encountered in fabricating munitions, the same as the aspects discussed below. In connection with such workpieces with shapes the same as those of cartridge cases, that is, of an elongated conical form, the invention provides that the guiding means at the first and second levels are different and are adapted taking into consideration the inverting of the cartridge cases.

According to another aspect of the invention, each level of the operating drum comprises, on the one hand, working positions of which the places of retention of the workpieces are defined by two idle rollers, and on the other hand, between the working positions, a small pulley; an endless belt, entrained about pulleys, passes over said pulleys and the workpieces in order to drive the latter in rotation about their own axes while their continuous treatment continues, the pulleys of one level being able thus to lie above a working position of the other level.

More particularly, the two treating operations are varnishing or gumming of the collar of a cartridge case, one part, and the percussion cap as the other part of a cartridge case, such two operations being carried out, respectively, in the first and second levels of the operating drum.

Other characteristics and advantages of the invention will appear upon consideration of the following detailed descriptions and of the drawings appended hereto, in which.

An embodiment of continuously moving chain or train being difficult to describe completely other than by the drawings, the drawings annexed to the present description are to be considered as incorporated in the specification, to aid in the definition of the invention.

Figures 1, 1A, 1B, 1C, 1D:
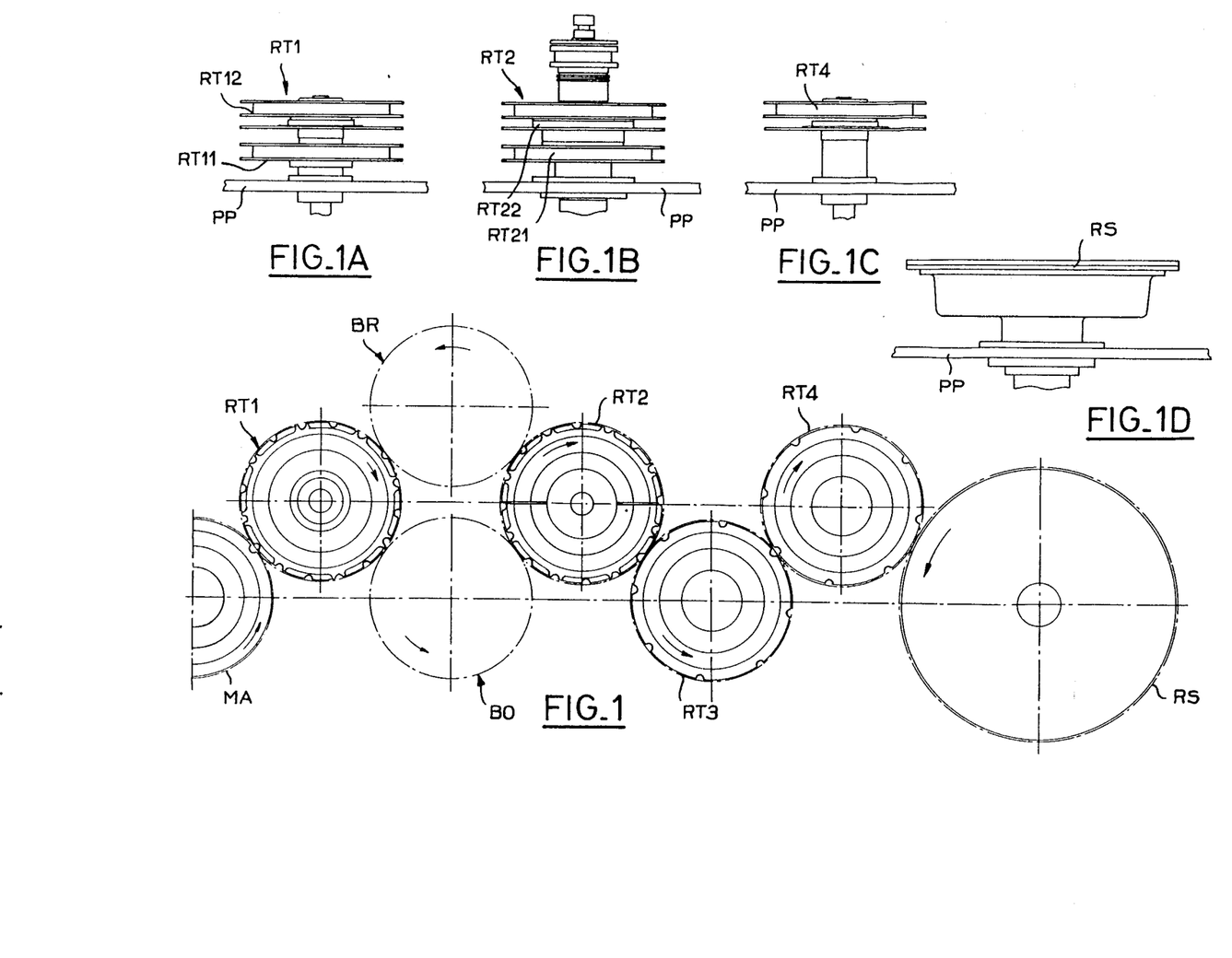
FIG. 1 is a schematic view in plan showing the principle of a continuously moving chain or train in which there is incorporated the present invention.
FIGS. 1A to 1D illustrate schematically in elevation the different wheels and drums shown in FIG. 1.

First of all one should refer to the continuously moving chain or train of FIG. 1, which treats a cartridge case first in a lower level, in which it is designated C', and then, after inverting them, in an upper level in which they are designated C.

Such train comprises a first feeding module MA, which can be, for example, of the type described in the publications and patents referred to above. Such entry or feeding module MA is followed by a first transfer wheel designated RT1. Wheel RT1 cooperates with an operating drum BO, which cooperates in its turn with a second transfer wheel RT2. Wheel RT2 cooperates with a recycling drum BR which returns the workpiece to the first transfer wheel RT1.

The second transfer wheel RT2 also cooperates with another transfer wheel RT3 followed by a wheel RT4 which can also be, for example, a transfer wheel or for example a control drum to lead workpieces finally to the discharge wheel RS.

The wheels RT1, RT2, RT4, and RS are shown in plan in FIGS. 1A to 1D, respectively, which show the structure of such wheels in elevation. For example in FIG. 1A it can be seen that the first transfer wheel RT1 includes two stages of wheels, a lower stage RT11 and an upper stage RT12. FIG. 1B shows that it is the same for wheel RT2, in that it contains two stages RT21 and RT22. By way of contrast, each of the other wheels such as RT3 and RT4 includes only one stage in a manner illustrated in FIG. 1C.

It will be seen later that the operating drum BO includes two different levels, while the recycling drum BR is capable of passing the pieces from one of the levels of the downstream transfer wheel RT2 to the other level of the upstream transfer wheel RT1. In practice and by preference, the recycling drum takes the pieces from the lower level of the wheel RT2 in order to pass them to the upper level of the wheel RT1.

Under these conditions, the feeding wheel MA cooperates with the lower level RT11 of the upstream wheel RT1, which cooperates with the lower level of the operating drum BO. After having performed a first working operation upon a workpiece, drum BO passes the workpiece to the lower level RT21 of the downstream wheel RT2. The recycling drum BR passes the workpiece from the lower level of the wheel RT2 to the upper level of the wheel RT1. Finally, the operating drum BO carries out on its second, upper level a second treatment operation which is at least in part different from the first such operation. The workpieces are now returned by the upper level RT22 of the downstream transfer wheel RT2, to again be transferred finally to wheels RT3 and RT4, which are disposed at the height of the upper level as shown in FIGS. 1A to 1D, inclusive.

Figure 2:
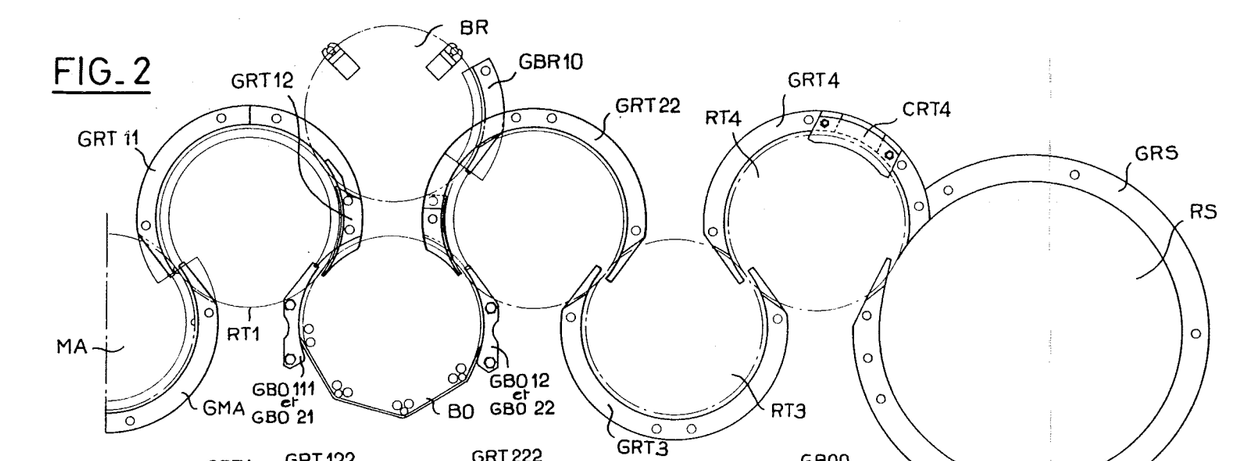
FIG. 2 illustrates the same sequence of the continuously moving chain as in FIG. 1, but with the guides which permit the cooperation of the workpieces with the different wheels and drums being shown more completely.

In FIG. 2 the wheels of FIG. 1 are not illustrated schematically by merely peripheral lines, but include means for guiding the workpiece which cooperate with the wheels in order to assure the travel of the workpieces being treated, such workpieces being shown as being cartridge cases which travel continuously through the apparatus.

Thus, the wheel forming the first feeding means MA, cooperates peripherally with a guiding means GMA, which extends to the point of tangency of wheel MA with the following wheel RT1, designated the upstream wheel. At the moment that the workpiece is about to leave the wheel MA to pass around the wheel RT1, it is taken in charge by a guiding means GRT11, associated with the lower part RT11 of the upstream wheel RT1. Such guiding means GRT11 permits the transport of the cartridge cases up to the guiding means GBO11 of the operating drum BO in its lower level. The workpieces or cartridge cases are retained up the operating drum BO without the necessity of guiding means which will be understood better further on in this description.

After the first operation treatment, the cartridge cases are taken in charge by a discharge guiding means, GBO12 then GRT21 which cannot be seen in FIG. 2, and which leads them by contact with the entry guiding means GBR10 of the recycling drum BR. The workpieces are then again at the lower level. The drum BR transfers the workpieces to the upper level where they are brought back by a similar guiding means employed with the wheel RT12, and its guiding means GRT12. The workpieces then pass by a guiding means CBO21 similar to the guiding means GBO11 to arrive at the upper level of the work drum BO. After the second working operation, the workpieces pass by means of the upper guiding means GBO22, to be taken in charge by the guiding means GRT22 at the upper level RT22 of the working wheel RT2. After this, all while the workpiece is at the upper level, the pieces arrive on the guide GRT3 of the wheel RT3, then on the guide BRT4 of the wheel RT4, such guide being shown in the illustrative embodiment interrupted at CRT4 in order to permit a control operation. Finally, the workpiece arrive at the level of the guide GRS of exit wheel RS, where they may be sorted or classified as a function of the resultant of the control.

Figures 2A, 2B:
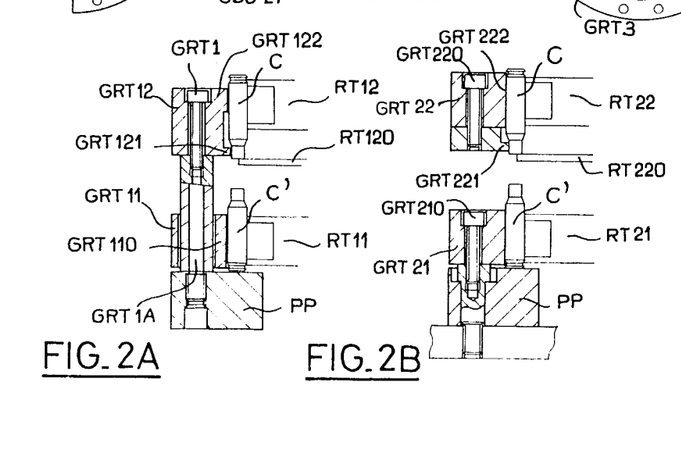
FIGS. 2A to 2C are views partially in section and partially in side elevation taken, respectively, along the lines A—A, B—B and C—C in FIG. 2.

FIG. 2A shows the two superimposed associated guiding means at the upstream wheel RT1. At the lower level, one sees on an axis GRT1 prolonged at GRT1A, in order to affix it to a plate PP, that the lower guiding means GRT11 comprises a right vertical section which is slightly conical and which cooperates with the inclination of the cartridge case. This is located between the wall GRT110 and the peripheral fork defined upon the wheel RT11. At the upper level, the guiding means GRT12 comprises a vertical upper part GRT122, and a lower part GRT121, which is slightly displaced axially toward the interior of the wheel RT12. The peripheral fork of the wheel RT12 cooperates with the cylindrical-conical sheath of the cartridge case, retained on the other side by the guide GRT122. The collar of the cartridge case is held in its turn by the guiding means GRT122, while the cartridge case rests on a supporting plate RT120, which defines its vertical positioning.

FIG. 2B shows analogous guiding means but at the level of the downstream guiding means RT2, which is made up of two levels RT21 and RT22, also in form of a peripheral fork upon which the cartridge case travels in respective forks with the collar disposed uppermost and lowermost. At the lower level, the wheel RT21 has its peripheral fork in contact with the cylindro-conical part of the cartridge case, the part which is at the other side resting upon the guiding means GRT21, which is affixed by a bolt upon the principle plate PP. The base of the cartridge case rests upon the same plate PP. At the upper level, the peripheral fork of the wheel RT22 also cooperates with the cylindro-conical part of the cartridge case, which is supported upon the surface GRT222 of the guiding means GRT22 which is fixed by a bolt GRT220 upon a piece affixed to the frame, and forming at GRT221 the guiding means for the collar or collet of the cartridge case. The extremity of the collar is supported upon a plate RT220. One sees then that the structure is almost the same as that for the wheel RT1, except that the two guiding means are mounted separately upon the frame.

Figure 2C:
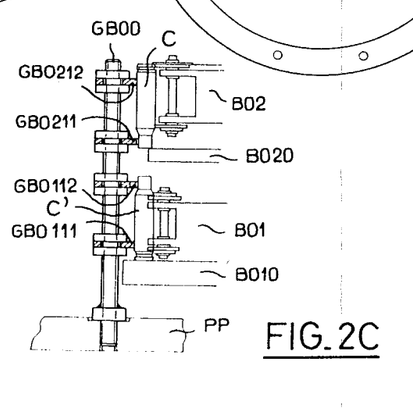

Finally, FIG. 2C shows precisely the guiding means which are disposed between the entry of the two stages of the operating drum BO, that is BO1 and BO2. The guiding means at the exit are substantially the same. It should be noted that the operating drum BO itself assures the maintenance of the cartridge case upon its periphery without the necessity of guiding means. The assembly of guiding means illustrated in FIG. 2 is affixed to a rod GBOO mounted on the plate PP. At the lower level the entrance guiding means is constituted by two tongues GBO111 and GBO112, which cooperate respectively with the cylindro-conical part of the cartridge case and with its collar. Upon the wheel BO1, the cartridge case is held against two rotatable rollers, against which they are maintained by a belt which travels along a part of the periphery of the drum, and is driven in rotation with respect to the wheel BO1. There is thus assured the rotation of the cartridge case about its own axis, as described in French Pat. No. 2,504,032.

Figure 3:
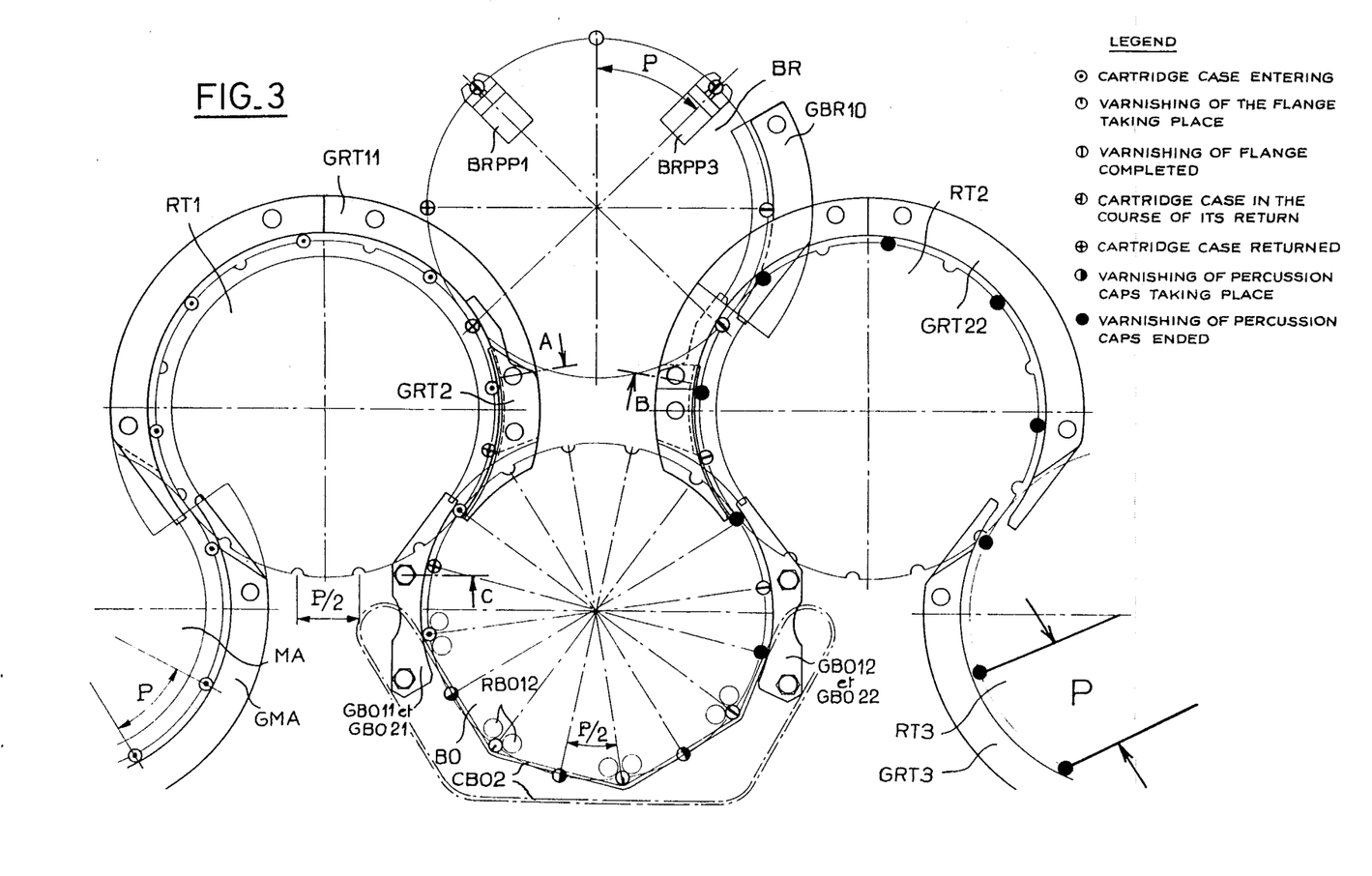
FIG. 3 is a view on a larger scale of a part of FIG. 2, such part including the elements of the recycling loop in accordance with the present invention.

FIG. 3 shows schematically the belt CBO2 operating at the upper level of the operating drum. At the upper level, the mounting of the cartridge case upon the wheel BO2 is substantially the same. But such cartridge case now cooperates with two guiding tongues GBO212 and GBO211, engaging respectively the cylindro-conical part and the collar of the cartridge case. Finally, the lower part or base of the cartridge case is supported upon a surface BO10, fixed upon the wheel BO1 for rotation therewith. Above, the collar of the cartridge case is supported by its extremity upon a surface BO20 affixed to the wheel BO2 for rotation therewith.

The description which is to be given will demonstrate that the elements employed at the level of the transfer wheels are simple, with guiding means without switching; incidentally, the guiding means at the first and second levels can be different in this embodiment and adapted to provide for the possibility of returning the cartridge case to the recycling level of the drum, also taking into account the general cylindro-conical form of the cartridge case, and finally taking into account the fact that the moving chain or train or the invention may selectively be employed to treat or process at different times different cartridge cases in different manners.

Reference should now be made to FIG. 3, which allows the functioning of the continuously moving chain or train of the invention in recycling to be better understood. FIG. 3 is limited to those parts of FIGS. 1 and 2 which perform such recycling. The feeding means MA is provided on its periphery with a section P in which the cartridge cases, there designated C', are disposed with their bases downwardly. Such cartridge cases are represented by a circle with a dot in its center. The cartridge cases thus traveling through the section P leave the guiding means to arrive upon the lower guiding means GRT11 of the upstream transfer roll RT1. Roll RT1 continues the transportation of the cartridge cases with their collars positioned upwardly, through the section P, in order finally to lead them to the lower level of the operating drum BO. It can be seen from FIG. 3 that an unworked cartridge case C' arrives with its collar disposed upwardly just at the point of contact of the roll RT1 at the lower level of the operating drum BO. On such lower level, the cartridge case undergoes a varnishing of its collar or collet. Such operation is carried out in the course of passage of the cartridge case on the lower level of the operating drum BO. The fact that the operation of varnishing the collet or collar of the cartridge case is represented by an arrow located radially of a radius in the circle which represents the cartridge case. When the varnishing of the collar of the cartridge case is ended, the circle representing the cartridge case in a right section comprises a diametral arrow. The cartridge case is then taken by the exit guide GBO12 in the lower level of the operating drum.

It is to be noted at this point that all of the entering and exiting means of the operating drum are associated with return tongues (not shown) of the band or belt CBO1 or CBO2 passing by and engaging the cartridge cases to assure their rotation about their own axes during varnishing. The cartridge case passes briefly by the lower level of the upstream transfer roll RT2, to be engaged by the holding means such as BRPP1 and BRPP3 mounted upon the recycling drum BR. Retention of the cartridge cases is aided by the entry guiding means GRB10 of the recycling drum BR. In the preferred mode of practicing the invention, such retaining means are operated to return the cartridge case to its former path. The fact that the cartridge case is inverted during its travel is shown by a radial line extending perpendicularly to the diametrical line across this circle representing the cartridge case.

It will aid in following the path of travel through the portion of the apparatus shown in FIG. 3 to refer to the legend on the sheet of the drawing bearing FIG. 3.

When the cartridge case has been completely inverted, this is shown by a cross within each of the circles representing the cartridge cases. The cartridge case is then near its discharge from the recycling drum BR, but this time it is at the upper level. The cartridge cases are taken in charge by guiding means GRT12 on the upstream transfer wheel RT12. It is to be noted that this resumption of travel is carried out with the turning of the cartridge cases through 180° so that the cartridge cases, which entered the drum MA upside down are now in a rightside up position. The cartridge cases C thus inverted are now interspersed, in alternation, with the cartridge cases which entered from the drum MA. It is to be realized here, looking at the tops of the transfer wheels RT1 and RT2, as well as the operating drum BO, that there is there provided a continuous conveying system with an apparent spacing P/2 between successive cartridge cases (FIG. 3), P being the normal spacing between successive cartridge cases elsewhere in the system.

The inverted cartridge cases C now arrive at the entering guiding means GBO21 on the upper level of the operating drum BO. There they undergo a second working operation or treatment, which is the varnishing of the percussion cap. Such varnishing operation, as indicated in the legend on the sheet of drawing bearing FIG. 3, is indicated by the blackening of one-half of the section of the circle indicating the cartridge cases. When such varnishing operation has been finished, the cartridge cases are then indicated by the entire blackening of the circle employed to designate the cases. The cartridge cases are now taken up by the upper discharge guiding means GRT22 of the upper level RT22 of the downstream transfer roll RT2. At the beginning of the downstream transfer wheel RT2, the cartridge cases are again spaced apart in their travel by a distance P/2. When the cartridge cases at the lower level have left the roll RT2, they are spaced a distance P as is indicated in the lower right of FIG. 3, and the cartridge cases are now normally returned by the transfer wheel RT3 with a spacing P or by other means for returning the cartridge cases.

To facilitate the comprehension of the invention, there are now described by reference to FIGS. 4 and 5 the construction of a preferred embodiment of the operating drum BO.

Figure 4:
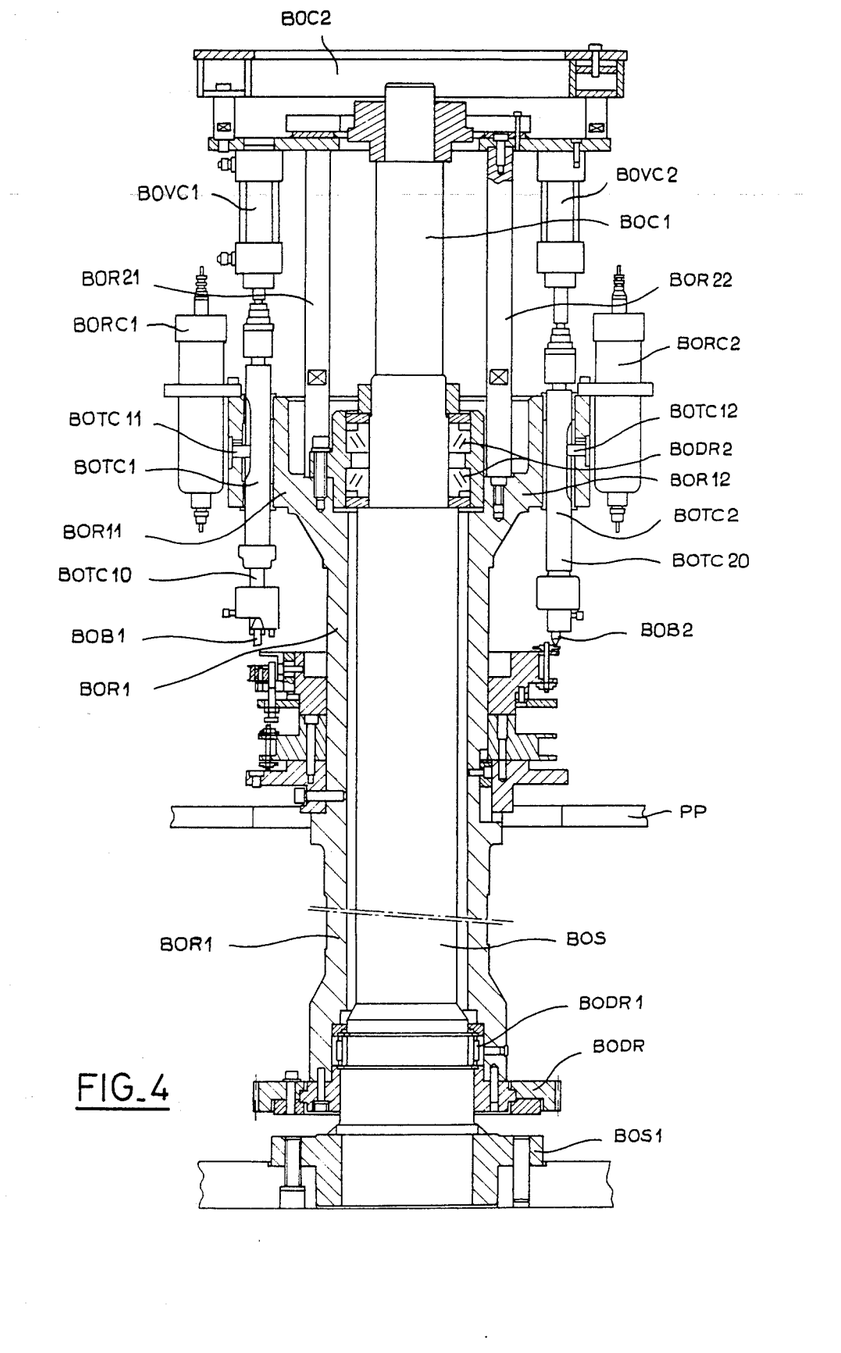
FIG. 4 is a view in section of a particular preferred embodiment of the operating drum BO of FIG. 3.

Turning first to FIG. 4, the operating drum BO is located in fixed position relative to the frame of the machine, being fixed in position relative to the principle plate PP thereof. The fixed part of the operating drum BO is designated BOS, and comprises a central column designated by such reference character. In its upper portion such column is designated BOC1, which is of reduced diameter. The fixed parts are so constructed and arranged as to assure the conduction of various necessary fluids, in particular lubricants and varnish, to the operating parts of the drum. Such conduction of fluids is notably made at the level of the zone of cooperation between the axle or arbor BOC1 and the head BOC2 of the operating drum. Such head BOC2, the structure of which is not shown in detail, supports hydraulic cylinders such as BOVC1 and BOVC2, the piston rods of which are connected to rods BOTC1 and BOTC2, respectively, which reciprocate in bores provided in rotating members BOR11 and BOR12, respectively. The rods BOTC1 and BOTC2 are provided with longitudinally extending grooves cooperating with radial pins BOTC11 and BOTC12 which prevent the respective rods from rotation about their axes. The turning parts BOR11 and BOR12 which are in fact integral with the piece in the form of a column, are connected by the columns BOR21 and BOR22 to the inner part of the head or cover BOC2. Such ensemble turns about the upper bearing BODR2 on the lower part of the shaft BOC1. The members BOTC10 and BOTC20, as well as members BOB1 and BOB2 attached to the lower part of the rods BOTC1 and BOTC12 will be described hereafter in reference to FIG. 5.

It should be noted now that the reservoirs BORC1 and BORC2, are provided with valves for dispensing the varnishing fluid, from which the varnish is conducted to the respective nozzles BOB1 and BOB2. The feeding of varnishing fluid to such reservoirs is carried out by flexible hoses, not shown, leading from the head BOC2, the feeding of varnishing fluid being accomplished by the shaft or vertical column, as previously indicated.

In the lower part, the annular zone designated BOR11 and BOR12 continues as a hollow shaft BOR1, forming the body of the rotor, and which is rotatably supported at the lower end by another bearing BODR1 upon the stator BOS. Finally, at the very lower end, it is to be noted that at BODR1 there is affixed a ring gear which assures the driving of the rotor, while BOS1 is an annular member which affixes the stator to the frame of the apparatus.

Figures 5, 5A:
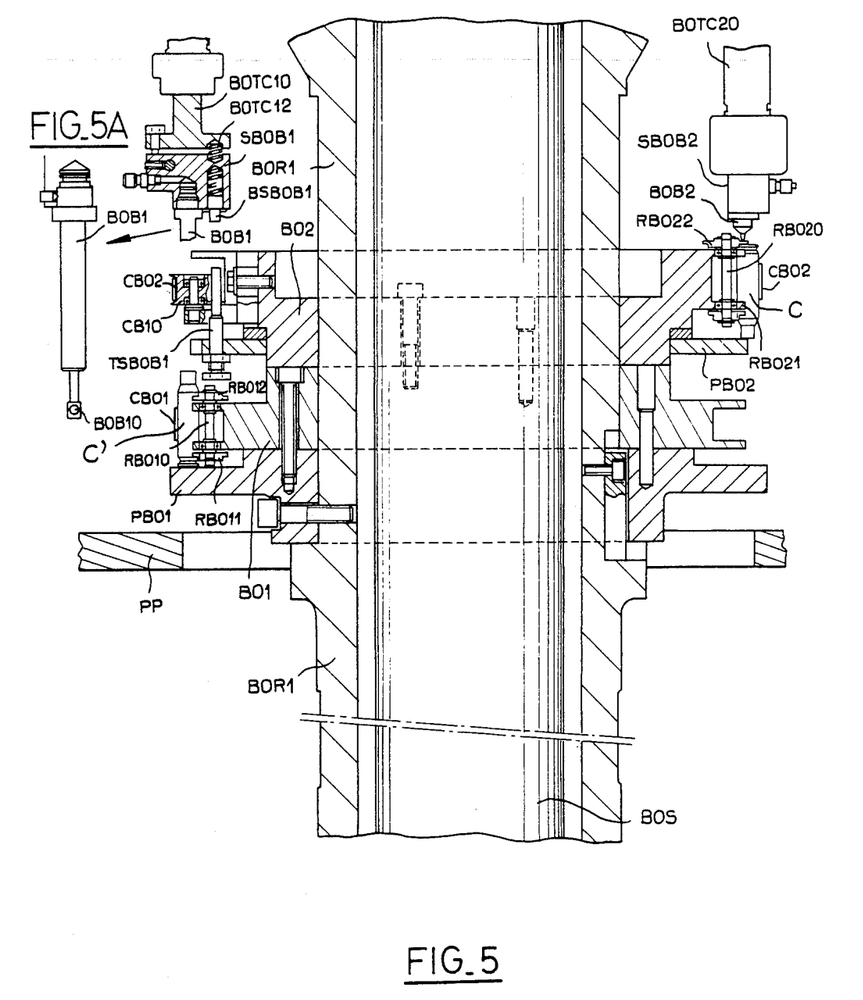
FIG. 5 is a view in greater detail of the apparatus shown in FIG. 4, such figure showing the part of the drum which includes the supports for the workpieces.
FIG. 5A illustrates a detail of a part cooperating with one of the supports for the workpieces.

FIG. 5 better illustrates the central part of the operating drum shown in FIG. 4, and shows, fixed upon the rotor BOR1, a lower piece PBO1 which serves on the one hand as for the support of the bases of the cartridge cases C at the lower level, and on the other hand for the fixation of the lower wheel BO1 and in the second place the location of the inferior or lower wheel BO2. The wheel BO2 is affixed in its turn to a piece PBO2, which serves as a support for the ends of the flanges of the cartridge cases.

The parts shown in FIG. 5 which have already been described in connection with FIG. 4 do not need to be again described.

The lower wheel BO1 presents, on its forked periphery, stub shafts such as RBO10, which support the rollers RBO11 and RBO12, disposed as a pair about the emplacement of the cartridge case. Thus, the cartridge case is supported on the peripheries of two pairs of rollers, as can be seen when FIG. 5 is viewed in connection with FIG. 3. Finally, the cartridge cases are thrust against the pairs of rollers by belts or bands designated CBO1 at the lower level, and CBO2 at the upper level. These belts are driven at a peripheral speed different from the peripheral speed of rotation of the wheels BO1 and BO2, thus producing a speed of rotation of the cartridge cases about their own axes.

Disposed vertically above the lower wheel BO1, the wheel BO2 carries precisely a roller CB110, which serves to support the ring CBO2, between two emplacements for the cartridge cases. At the other extremity of the wheel BO2, there can be seen a post for supporting cartridge cases fed as described with the aid of a vertical shaft RBO20 carrying two pairs of rollers such as RBO 21 at the bottom and RBO22 at the top, such rollers assuring the support of the cartridge case, while it is driven in rotation by the peripheral belt CBO2 which passes on the wheel CB10, above described. It has already been stated that at the lower extremity of the flange the cartridge case C rests here upon a plate PBO2. At the opposite side, the same plate PBO2 serves to support a rod TSBOB1, which is adjustable in axial position in a vertical direction. The free end of such rod TSBOB1 is susceptible to move in relation to contact an abutment BSBOB1, which forms part of the support BOB1 of the nozzle BOB1 which assures the varnishing of the flange.

Such nozzle is schematically illustrated in FIG. 5A and comprises an atomization nozzle BOB10, which is situated normally near the flange of the cartridge case, said nozzle BOB1 passing between two rollers CB10, to the interior of the belt CBO1, in order to place the orifice BOB10 at the level of the flange of the cartridge case on the lower roll BOB1. The vertical positioning of the cartridge case is precisely assured by the cooperation of the abutment BSBOB1 with the previously described rod TSBOB1. For the rest, the nozzle BOB1 is fixed as indicated by its extremity in a schematic view, designated BOB1 in FIG. 5, the support of such nozzle being SBOB1. The latter is mounted for rotation upon a shaft SBOB10, and such support can pivot by reason of an elastic support BOTC12 with respect to the end BOTC10 attached to the rod BOTC1 as shown in FIG. 4. The pivotal movement of the support SBOB1 is limited by an abutment BOTC11 which cooperates with this support which is opposed by the abutment BSBOB1.

The function of the apparatus is simple: In the course of the rotation of the operating drum BO, the nozzle decends under the effect of the rod BOTC1 in order to place itself with precision at the height of the flange of the cartridge case C, in a manner defined by the cooperation by the abutment BSBOB1 with the rod TSBOB1, which is affixed in turn upon the wheels BO2 and BO1. There appears here an important advantage of the invention, that is to say that a benefit is derived from the displacement of the cartridge cases between the two levels of the operating drum BO, one can interpose a number of working or treating means of apparatus, here a nozzle for varnishing or sizing, and also such auxiliaries as the rod of the abutment TSBOB1, without omitting the wheels or rollers such as CB10 which form the reverse for the peripheral bands which assure the rotation of the cartridge cases about their own axes.

At the right hand part of FIG. 5, the other rod BOTC2 has an extremity BOTC20. Such extremity BOTC20 in its turn receives by a suitable connection the support SBOB2 of a nozzle BOB2 charged with varnish or sizing for the percussion cap of the cartridge case. Simpler than the proceeding, such nozzle goes to the extremity of the cartridge case to deposit a coating of varnish or gum in the course of the rotation of the cartridge case about its longitudinal axis.

There will now be described, in reference to FIG. 6, the structure of the recycling drum BR. Said drum carries, similarly to the operating drum BO, in its lower end a driving gear fixed to the rotor BRR1, which is here a circular cylindrical shaft. Such shaft BRR1 rises to an upper part, where it carries a head or crown generally designated BRR2. In turn, such head BRR2 receives a cylindrical rod or shaft such as BRR3, forming a support for the lower head or crown of the rotor BRR4, the latter turning around the stator BRS1 by the intermediary of a bearing BRS11. At its lower part, another bearing BRS10 is provided between the stator BRS1 and the rotor BRR1. It is to be noted that the stator BRS1 is affixed at PP6 upon the principal plate PP of the machine.

In the upper part, the stator BRS1 carries a protrusion BRS2, provided with a ring BRS3 which defines a closed cam profile permitting a cam following roller BRR73 received therein to perform a reciprocating vertical movement.

As previously indicated, alternating with columns such as BRR3, the rotor supports in its lower part BRR4 vertical shafts or guides such as BRR7, which form guides for vertical reciprocation. Each of the guides BRR7 carries a transverse rod or shaft BRR72 serving as an axle for a roller BRR73 which engages in the groove BRS3 previously described. In the upper part, the guide BRR7 carries a finger BRR71 which engages in a vertical slide BRR21 conveniently mounted in the head of the rotor BRR2. Below, the guides BRR7 glide in seats BRR61 and BRR62 in the part BRR6 situated opposite part BRR4. Such part carries, slightly displaced radially with respect to the guide BRR7, an axle BRSP10, provided with a gear BRSP11, which meshes with gear teeth, not shown, mounted upon the guide BRR7. It can be immediately seen that in the course of rotation of the recycling drum, the guides BRR7 are subjected to vertical movement, which causes a rotation of the axle BRSP10 upon itself. The axle BRSP10 then drives in its part a gripping support BRSP1, provided with a transverse housing by an axis BRSP15, around which there is mounted gripping means designated BRPP1, which retains the cartridge case. It will be understood by one skilled in the art that the recycling drum shown in FIG. 6 is adapted to assure a changing of the level of the cartridge case, and at the same time an inverting of it. The left hand part of the drum shows a cartridge case C′ in the position of entry upon the recycling drum, while the right hand part of FIG. 6 shows the same cartridge case, now designated C, in a position to leave the recycling drum.

Figure 6:
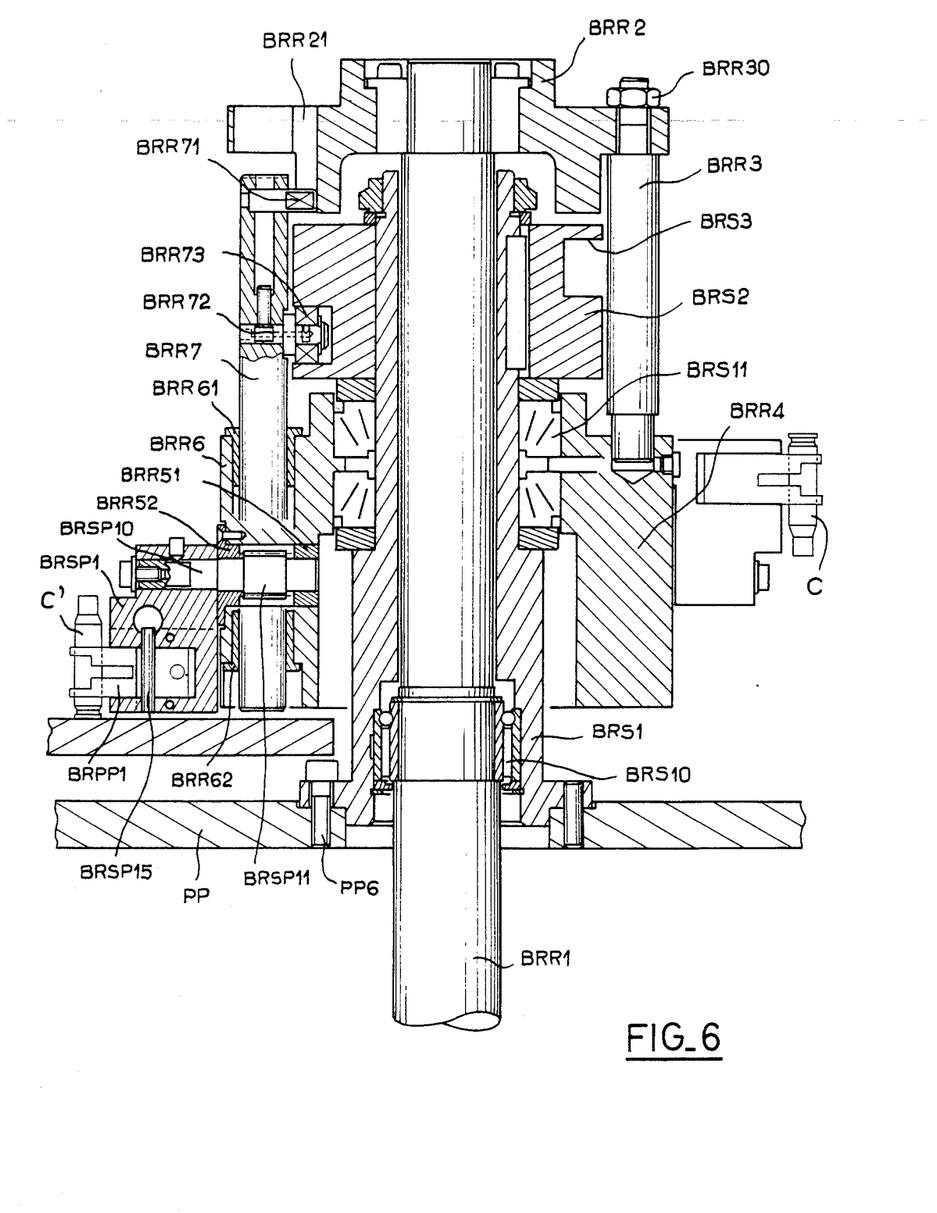
FIG. 6 is a view partially in elevation and partially in section of the recycling drum BR of FIG. 3

Other embodiments than those of FIG. 6 can be employed for the recycling drum; it is to be observed that in the preferred embodiment, the radial axis pivoting of the cartridge cases can be changed to be near the horizontal plane intermediate between the two levels BO1 and BO2 of the operating drum, the returning of the pieces occurring around a fixed axis, independent of their height or size.

The detailed description above has been given in the particular case of varnishing or gumming of cartridge cases, operations which occur at the two opposite extremities of each cartridge case. Such particular application has the merit of displaying the advantages of the invention, taking into account the numerous equipments and accessories necessary for the varnishing or gumming at the lower end of the operating drum. Another advantage appears at the level of the transfer wheels: these can be realized by the fixation of two standard wheels one on another, with an angular shifting corresponding to the fraction (here shown as P/2) of the predetermined spacing between the cartridge cases.

Although the invention is described and illustrated with reference to a single embodiment thereof, it is to be expressly understood that it is in no way limited to the disclosure of such preferred embodiment but is capable of numerous modifications within the scope of the appended claims.

We claim:

1. In apparatus for the treatment of cartridge-cases moving continuously through a train of manipulating and cartridge-case-treating instrumentalities, said train having an operative drum adapted to carry out a treatment, transfer means downstream of the operating drum to lead the cartridge-cases to and from the operating drum, respectively, and to replace them respectively, and recycling drum disposed between the transfer means downstream and upstream of the operating drum, the operating drum and the transfer means being of such construction as to permit cartridge-cases to pass a plurality of times through the operating drum, as well as means for feeding cartridge-cases to the upstream transfer element and the means for returning the cartridge-cases after their discharge by the downstream transfer element, the improvement wherein:

the operating drum is provided with a first and a second level of circulation of cartridge-cases where there are carried out two treating operations which are at least partially different, the working positions in the two superimposed levels of the working drum being displaced a distance which is a fraction of the normal distance between successive cartridge-cases as they travel through the train, the upstream transfer means and the downstream transfer means each has a first and a second wheel, the wheels being superposed, the wheels being displaced by the same said fraction of the normal spacing between the cartridge-cases, the first wheels of the upstream transfer means and the downstream transfer means each cooperating with the first level of the operating drum, while the second wheels of the upstream and the downstream transfer wheels cooperate with the second level of the operating drum, the means for feeding the cartridge-cases to the continuous chain cooperates with the first wheel of the upstream transfer means, while the means for returning the cartridge-cases cooperate with the second wheel of the transfer means downstream of the operating drum, said two transfer means passing the cartridge-cases with a normal spacing between consecutive cartridge-cases, and the recycling drum is provided with means to change the level of travel of the cartridge-cases thereover to cause the cartridge-cases to pass from the first wheel of the downstream transfer wheels to the second wheel of the upstream transfer means, whereby to permit at one time the use of simple elements at the different levels of the transfer wheels, with guiding means without switching means, all while increasing the angular displacement between the two levels of the operating drum to permit the interposition of means for shaping or treating of the cartridge-cases, the two operations of treatment being varnishing or gumming of the flange of a cartridge-case on the one hand and the percussion cap therefore on the other hand.

2. Apparatus according to claim 1, wherein the second level is above the first level.

3. Apparatus according to claim 1, wherein the said fraction of the normal spacing between successive cartridge-cases is one-half of such spacing.

4. Apparatus according to claim 1, wherein the recycling drum carries each cartridge-cases by a retaining means adapted for vertical movement upon the rotor of the drum, such last-named means cooperating with a helicoidal cam upon the stator of the drum.

5. Apparatus according to claim 4, wherein the retaining means is pivotally mounted for movement about an axis radial of the rotor of the drum in such fashion as to invert the cartridge-cases during its change of level.

6. Apparatus according to claim 5, wherein the rotor of the drum carries a vertical guide driven by a rack gear, and that said retaining means is mounted upon a pivotal block connected by a gear meshing with said rack gear of the guide.

7. Apparatus according to claim 5, wherein the radial axis of the pivoting is near the horizontal median plane between the two levels of the operating drum, the inverting of the cartridge-cases being carried out around a fixed axis independent of the height of the cartridge cases.

8. Apparatus according to claim 5, wherein the cartridge-cases are in the form of elongated conical shapes, and the guiding means of the first and second levels are different and adapted for the inverting of the cartridge cases.

9. Apparatus according to claim 1, wherein each level of the operating drum comprises on the one hand working positions of which the positioning of the cartridge-cases is carried out by two idle rollers and on the other hand between two working positions there is a pulley, and an endless belt carried over the pulley passes over pulleys and the workpieces in order to rotate the cartridge-cases about their axes during their treatment and their movement through the operating train, the pulleys of one level being disposed above the working station of the other level.

10. Apparatus according to claim 9, wherein the two operations of treatment are varnishing or gumming of the flange of a cartridge case on the one hand and the percussion cap thereof on the other hand, said two operations being carried out, respectively, at the first and second levels of the operating drum.

11. Apparatus according to claim 10, wherein between two working stations of the upper level of the operating drum there is provided an abutment forming a reference for the position for the operation carried out in the lower level of the operating drum.

* * * * *